United States Patent [19]

Palmer

[11] 3,883,868

[45] May 13, 1975

[54] SWEEP FREQUENCY CONTROL APPARATUS AND METHOD

[76] Inventor: Ronald S. Palmer, 5784 Herma, San Jose, Calif. 95123

[22] Filed: July 23, 1973

[21] Appl. No.: 381,837

[52] U.S. Cl. ............... 340/408; 340/409; 340/151; 340/152 T
[51] Int. Cl. ............................................. H04n 7/10
[58] Field of Search ........ 340/408, 409, 222, 152 T, 340/151, 163, 207

[56] References Cited
UNITED STATES PATENTS

| | | | |
|---|---|---|---|
| 3,164,771 | 1/1965 | Milford | 340/151 UX |
| 3,757,035 | 9/1973 | Sullivan | 340/152 T |

*Primary Examiner*—Harold I. Pitts
*Attorney, Agent, or Firm*—Townsend and Townsend

[57] ABSTRACT

Apparatus and method for sensing flux disturbances at a number of different, operative locations remote from a central controller. A sweep frequency generator applies an output signal to the sensors at the various operative locations and a flux disturbance at a particular location is represented by a resonant condition at a characteristic frequency responsive to the generator output signal. The sensed information is directed to the controller which determines if the frequency at which resonance occurs is the proper frequency for the particular location and, if so, the controller sends a control signal to an actuable mechanism corresponding to the particular operative location. In one embodiment, the apparatus has a plurality of control modules at respective operative locations, the modules being coupled by a pair of coaxial cables to the controller and the sweep generator, respectively. The outer conductors of the cables interconnect a d.c. power source to the electronic components of each module, respectively. A flux disturbance at an operative location occurs when an enabling device capable of resonating at a characteristic frequency is brought into proximity to the module. Each mechanism is operated by the controller when the resonant frequency corresponds to that which is programmed in the controller for the particular operative location. In another embodiment, the apparatus has a single control module inductively coupled to a plurality of tuned circuits, each having a characteristic frequency and sensitive to a predetermined change. The sensed information can represent acquired data useful to operate certain mechanisms through the controller. In a third embodiment, a single control module uses a notch filter adapted to receive an analog signal which can be represented digitally and used to actuate the controller and thereby an operable mechanism corresponding thereto.

10 Claims, 11 Drawing Figures

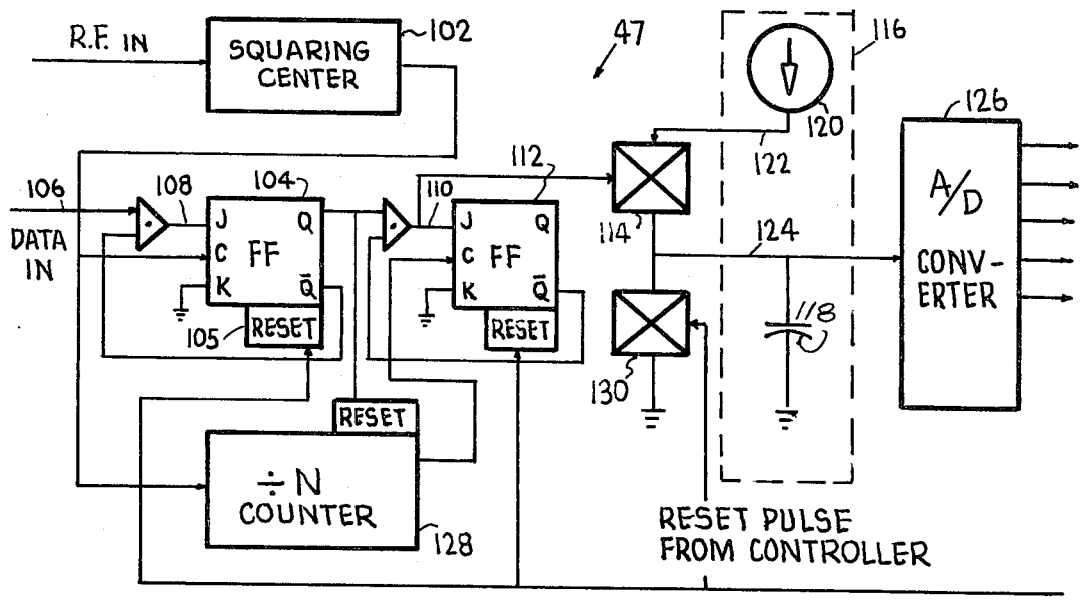
Fig. 5
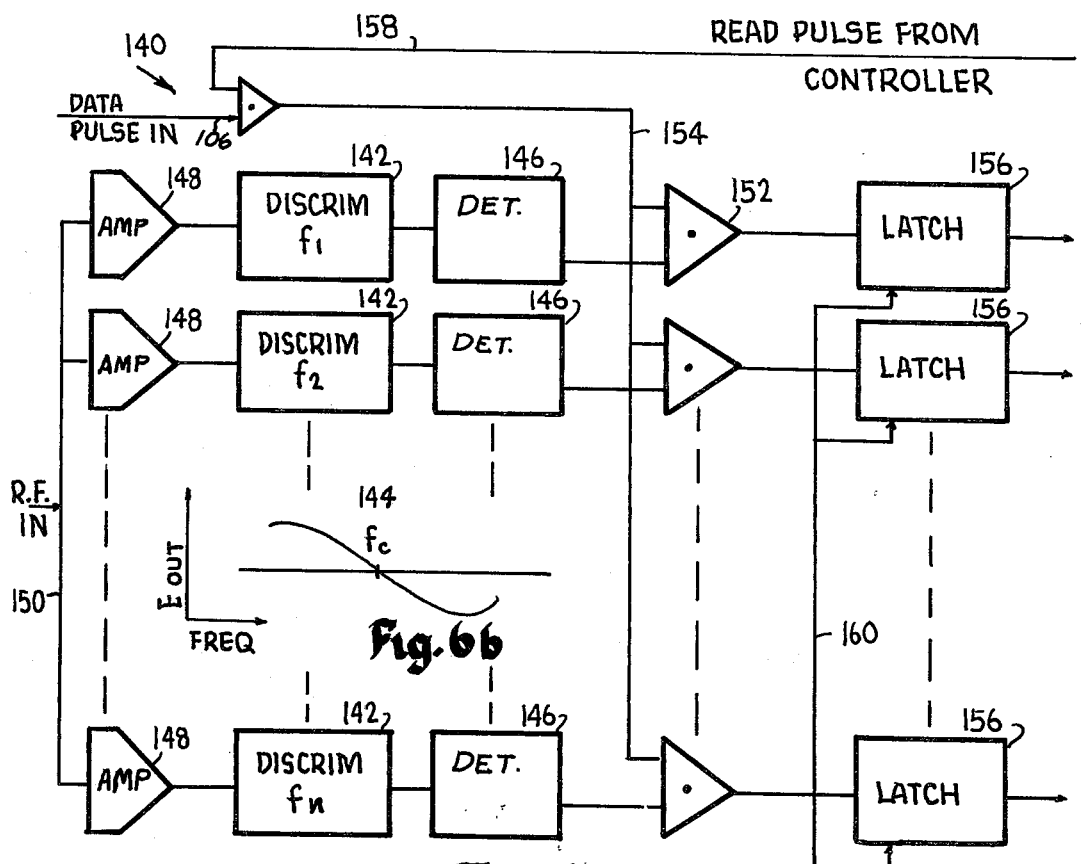
Fig. 6b
Fig. 6a

SWEEP FREQUENCY CONTROL APPARATUS AND METHOD

BACKGROUND OF THE INVENTION

This invention relates to improvements in remote control techniques and, more particularly, to apparatus and a method for controlling a plurality of operable sensors adapted for use in actuating various mechanisms or as data acquisition devices.

BACKGROUND OF THE PRIOR ART

Remote control apparatus heretofore used have generally included various actuatable devices at respective, remote locations from a controller. Each such device has been connected by its own electrical conductor assembly to the controller. Thus, a relatively large number of cables or bundles of cables have been required to interconnect the controller with the various operable devices. This not only increases overall costs but results in a maze of wires which are extremely difficult to handle and to install. A need, therefore, has arisen to simplify remote control systems, hopefully to eliminate the maze of interconnecting wires as well as to take advantage of the high speed and reliability of digital techniques.

Key cards consisting of electrically resonant circuits can be read by flux disturbance sensors as described in copending U.S. application Ser. No. 181,865, filed Sept. 20, 1971, now U.S. Pat. No. 3,732,465, and entitled, IMPROVED ELECTRONIC SENSING & ACTUATOR SYSTEM. An R.F. sweep oscillator excites an inductive coil in the presence of the key card. At the key card's resonant frequency, the disturbance in the coil's flux is sensed and, through amplifying circuitry, turned into a logical pulse. Thousands of different resonant circuit combinations can be read in a single sweep of the R.F. oscillator as each logical pulse from the disturbance sensor can be affected with a different and distinct resonant frequency. One area of application for this type of flux disturbance sensor is in security control of large buildings, especially hotels. A sensor located in or adjacent to each door can be coupled to a centrally located computer which controls which key cards should open which doors.

The problem with a system of this type is the large number of different conductors that must interconnect the central computer or controller with the sensors of the various doors. Because the code is derived from the leading edge of the logic pulse and the corresponding instantaneous R.F. frequency at that time, fast rise, high-quality pulses must be sent to the computer, thereby precluding the use of telephone wire or twisted cable. Coaxial cable, on the other hand, to each individual and separate door, would be prohibitively expensive.

SUMMARY OF THE INVENTION

The present invention is directed to an improved apparatus and method for remotely controlling a plurality of spaced, operable mechanisms which, when actuated, can perform certain functions, such as unlocking doors, sounding alarms, recording of data and the like. Typical of such mechanisms are the various bolts of lock assemblies in the doors of a multi-door establishment, such as a hotel, office building and the like.

The present invention overcomes the problem mentioned above with respect to connecting the controller to the various sensors by serializing the logic pulses in a manner such that a single cable assembly comprised of two coaxial cables can be used to interconnect the sensors with the controller and with a sweep frequency generator. The invention allows for a relatively simple polling routine in the controller to avoid the problems arising when two or more sensors are actuated at the same time.

The sensors in the form of individual control modules are coupled in parallel by a first of the cables to the output of the sweep frequency generator, each module being responsive to the generator output signal when the latter has a particular frequency. Each control module operates, when an enabling device capable of resonanting is near it, to signal the controller of the presence of such enabling device, whereupon the controller interrupts its polling routine and re-addresses the control module which provides a data signal at the same time the resonant condition of the enabling device next occurs. The resonant frequency is sensed and compared with the known frequency corresponding to the particular module and stored in the memory of the controller. If the frequencies match, the controller sends a control word to the module to cause operation of the mechanism associated with the control module. Following this, the controller once again commences its polling routine and repeats this until the next enabling device is brought into proximity to a control module.

The system can utilize only a single control module with a plurality of sensing stations all inductively coupled to the module. Thus, a plurality of sensing regions, such as for sensing fire and smoke, can be polled by the controller so that, for instance, upon the closing of a switch of a specific region, a resonant condition will occur thereby providing the necessary enabling action by way of a logic pulse for controlling a particular operable device.

The system can also be used as an analog-to-digital converter. This is accomplished by varying one of the resonant circuit elements at a sensing region and allowing the controller to read a frequency proportional to the analog signal.

The primary object of this invention is to provide improved apparatus and method for remotely controlling one or more operable mechanisms which are responsive to certain discrete resonant conditions at a number of different operative locations wherein decision-making with respect to activities at the various operative locations can be made quickly and easily so that the invention is suitable for a wide variety of uses, such as the security control of the access doors of a building or the like.

Another object of this invention is to provide apparatus and method of the type described wherein each mechanism is controlled by sensing a flux disturbance at a respective one of a number of different control locations by establishing a resonant condition and by directing the sensed information to a remote controller which determines the frequency of the resonant condition and compares it with a known standard for the particular location so as to permit the controller to decide whether or not to actuate the mechanism, all of which functions can be performed in a minimum of time and for possible activities or conditions at a large number of different control locations.

A further object of this invention is to provide apparatus and a method of the type described wherein a plurality of control modules are provided at respective control locations and coupled to a sweep frequency generator and to a central controller only by a pair of coaxial cables so that the aforesaid resonant conditions can be developed and information can be sent between the modules and the controller without the need for individual conductors between each module and the generator and controller.

Another object of this invention is to provide apparatus and a method of the aforesaid character wherein the sensing of the information can be done with a single control module coupled to a number of different tuned circuits responsive to certain changes in the vicinities thereof so that the system is suitable for data acquisition and can be utilized to sense data at various control regions by generating resonant conditions as the data-defining change occurs to thereby provide an instantaneous output which can be sensed by the module and directed to the controller for subsequent processing.

A further object of this invention is to provide apparatus for receiving an analog signal and for developing a resonant frequency condition in response thereto so that the resonant condition can represent the value of the analog signal so as to permit the controller to process the information and to make decisions as needed.

Other objects of this invention will become apparent as the following specification progresses, reference being had to the accompanying drawings for an illustration of several embodiments of the invention.

BRIEF DESCRIPTION OF THE DRAWINGS

In the drawings:

FIG. 5 shows an interval timer used to translate the instantaneous frequency when logic pulse is received at the central controller;

FIG. 6a shows a frequency discriminator array to accomplish the same action as the structure shown in FIG. 5;

FIG. 6b is a graphic view of the frequency response of a discriminator of FIG. 6a;

DESCRIPTION OF THE PREFERRED EMBODIMENT

Figure 1:
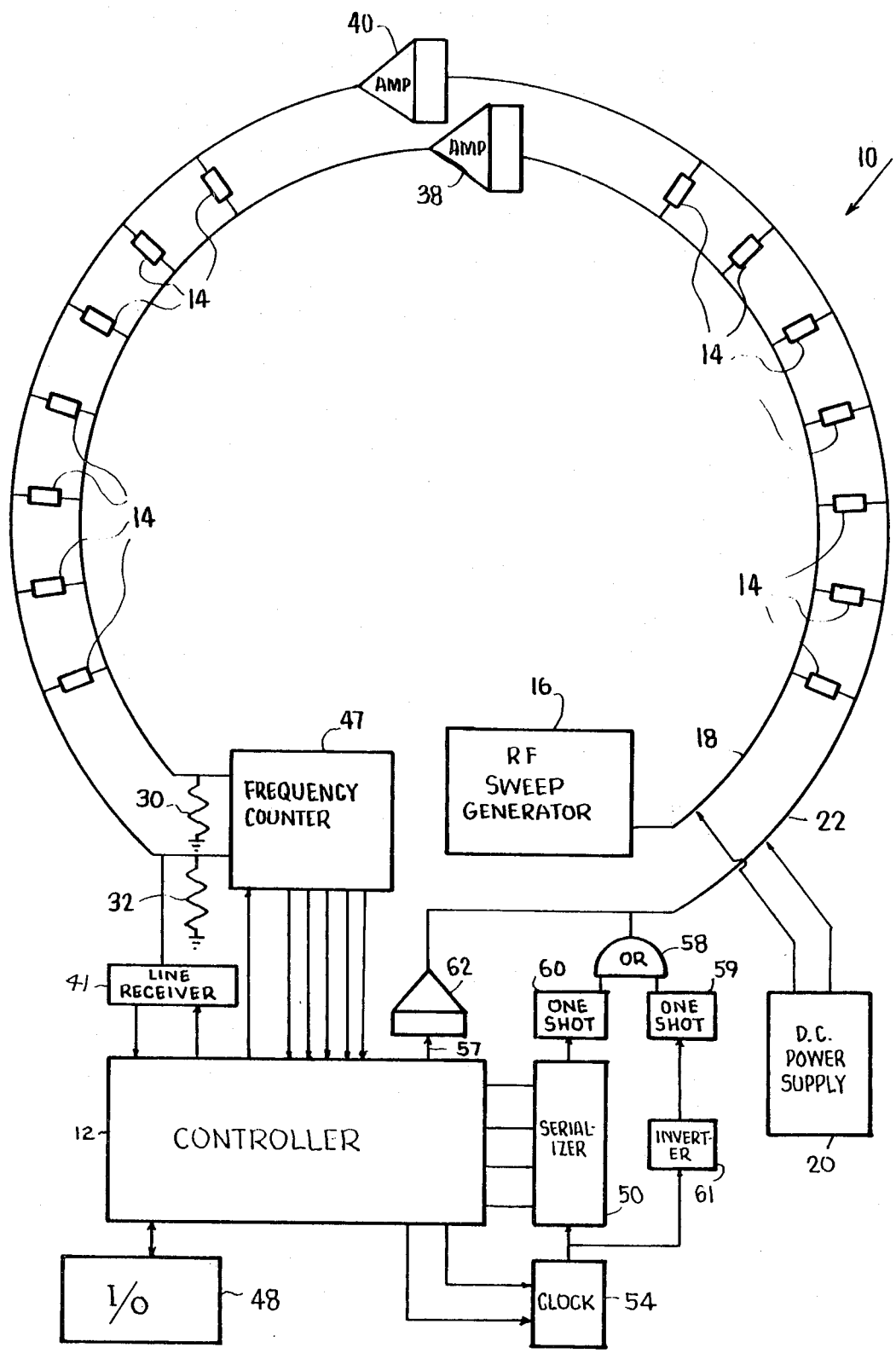
FIG. 1 is a block diagram of the apparatus of this invention, showing a pair of coaxial cables coupling a number of flux disturbance sensors to a central controller and a sweep frequency generator.

The apparatus of the present invention is shown schematically in FIG. 1 and is denoted by the numeral 10. Apparatus 10 includes a central controller 12, such as a minicomputer, and a plurality of modules 14 at respective, remote locations from controller 12. Each module has means for detecting a flux disturbance at its location and for generating a signal which can be used to actuate controller 12 in a manner to effect an action of some type, such as the opening of a door, sounding of an alarm and the like. A module 14 is shown schematically in FIG. 2 and will be described in greater detail hereinafter.

Figure 3:
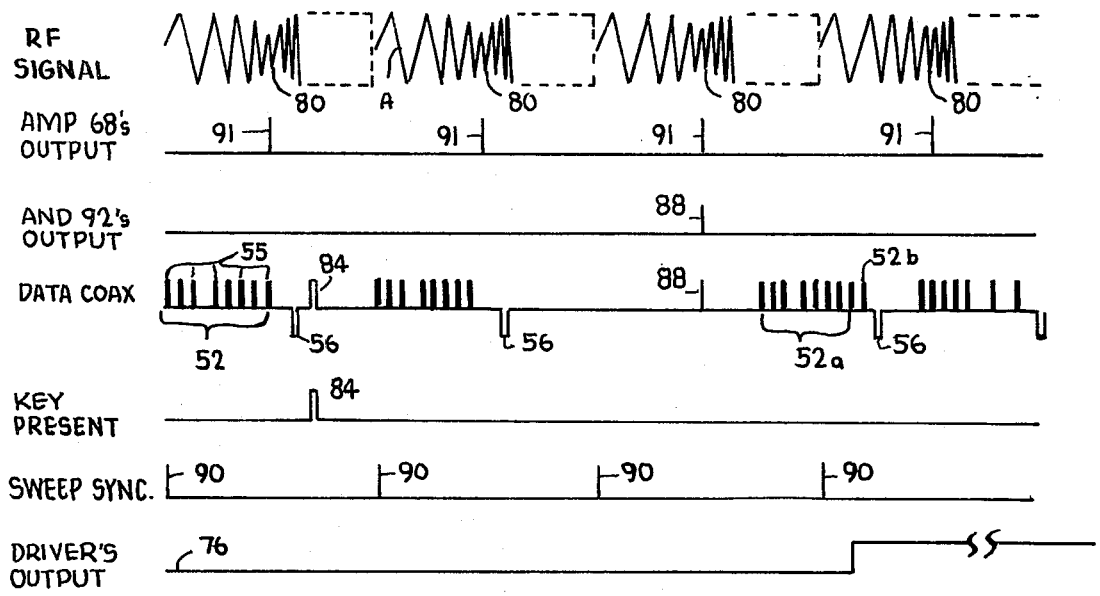
FIG. 3 is a timing diagram showing the sequence of operation of the apparatus.

The modules are coupled to the output of an R.F. sweep generator 16 by first conductor means 18. Generator 16 is capable of periodically sweeping between some lower frequency through to a higher frequency in a continuous manner such that all frequencies inbetween are applied to conductor means 18 successively. The sweep can be either up or down in frequency and a typical waveform is shown in FIG. 3 and denoted by the letter A, the dashed line regions of FIG. 3 denoting frequencies too high to be shown by a line drawing. FIG. 3 shows that, as the upper frequency is reached, the output of generator 16 reverts to the lowermost frequency and the cycle repeats.

For purposes of illustration only, modules 14 will hereinafter be described with respect to opening or unlocking respective doors of a number of different rooms remote from controller 12, such as the rooms of a hotel. This is accomplished when a module senses a key card of the type having means thereon for providing a resonant circuit such as the type described in the foregoing pending U.S. application Ser. No. 181,865. As will hereinafter be described, each module has means for detecting the presence of the resonant circuit of a key card adjacent to it, such as when the key card is moved into close proximity to the control module 14 and thereby causing an operative condition to occur. While apparatus 10 is especially suitable for use in the foregoing application, it is suitable for other applications as well.

Electrical power is supplied to each module 14 by a d.c. power supply 20. Preferably, first conductor means 18 and a second conductor means 22 cooperate to interconnect power supply 20 and the various modules. In the preferred implementation, each of first conductor means 18 and second conductor means 22 comprises a coaxial cable having a central conductor 24 surrounded by an external conducting shield 25. Power supply 20 is connected to each module through the shields 25 of the cables. The power input to each module (FIG. 2) is shown by leads 27 and 29.

Shields 25 are electrically isolated at the d.c. level but can be a.c. grounded by a capacitor so that the R.F. and data pulses hereinafter described will see a constant 50 ohm characteristic impedance by virtue of a pair of resistors 30 and 32 connected between ground and central conductors 24 of the two cables.

The coaxial cables can be quite long in length, especially if controller 12 is a great distance from the most remote module 14. In such a case, the cables are provided with respective repeater amplifiers 38 and 40, much like those used in CATV cable networks. The purpose of amplifiers 38 and 40 is to boost the R.F. and data signals to nominal levels.

Other forms of conductors could be used as well depending on the frequencies involved and length of conductor required. For example, twisted-pair cable or combinations of coaxial and twisted-pair cable could be used to make up conductors. Each sensor 14 has its own isolation amplifier 42 (FIG. 2) to avoid loading central conductors 24 of the two cables and to prevent unwanted reflections thereon. Even then, normal attenuation in the cables requires the use of repeater amplifiers 38 and 40 at regular intervals along the cables.

The two cables are shown as forming a loop with respect to controller 12. However, a loop is not necessary as the cables can be a straight trunk or a trunk with branches in configuration. As shown in FIG. 1, however, the R.F. frequency pulses and the data pulses are read at the terminating ends of central conductors, remote from sweep generator 16. In this way, the group delay introduced by a relatively long pair of cables will be the same on both cables. This permits the measurement of the proper resonant frequency when a resonant circuit is near a module regardless of how far the module is spaced from controller 12. Where the cables are relatively short in length, this group delay is not important. Thus, the R.F. and data pulses can be measured at the transmit end of the cables and the cables can terminate at the most remote module 14 or vice versa.

A line receiver 41 is coupled with central conductor 24 of second conductor means 22 and to controller 12. It operates to receive a gating pulse from the controller only when a data pulse is to be expected from a module 14, i.e., when a resonant circuit 44 (FIG. 2), such as that on a key card, is brought into proximity to an inductor 46 forming a part of the module. Line receiver 41 is gated to an "on" condition also when controller 12 is ready to read the sweep frequency corresponding to circuit 44. The sweep frequency will have been determined in a number of ways, such as by a frequency counter 46 (FIG. 1), by a computing counter, by a time interval measuring device, or by a frequency discriminator array. Frequency counters and computing counters are well-known in the art. For example, one commercially available computing counter can measure a frequency to three decimal digits in one hundred nanoseconds. This is accurate enough to determine the resonant frequency and the value is available in digital form for direct entry to controller 12. A time interval measuring device and a frequency discriminator array will also be described hereinafter with respect to FIGS. 5 and 6.

Controller 12, after receiving the resonant frequency from frequency counter 47 provides the go — no go decisions for a particular module having a resonant circuit thereby, depending on whether the measured resonant frequency is the correct one for the module. To this end, each module is responsive to a respective, predetermined resonant frequency or combination of resonant frequencies which is generally different from those of all other modules of the group. Controller 12, when it does receive the correct resonant frequency, issues control action pulses, drives displays and, if required, operates a teletype-writer 48 or an equivalent input-output device. In particular, other data collection devices could be used, such as printers, tape units, disk drives, or communication links which may or may not be connected to other computers. Controller 12 could be hard-wired; however, a minicomputer is preferred since it is in the latter that the data is centrally collected and acted upon.

Controller 12 addresses the various modules 14 successively through a serializer or shift register 50 which receives and sends out an address code to each module, respectively. For purposes of illustration, the address code for one of the modules is denoted by the numeral 52. Since only a single conductor, namely, central conductor 24 of cable 22, is available for data pulses between each module and controller 12, a self-clocking code must be used. An appropriate teletype code, phase modulated or, as shown in FIG. 3, a 1F/2F self-clocking code, could be used. The code is especially easy to decode in a module 14 by means of a one-shot multivibrator 51 (FIG. 2) and consists of a clock or reference pulse 55 followed by a "one" pulse if a "one" is to be transmitted and no pulse if a "zero" is to be transmitted. The address, 1011, is shown in FIG. 3 for purposes of illustration only. The code can be generated by the controller itself if the internal instructions speed is fast enough. If not, the control word to be sent to a particular module 14 is loaded in parallel into serializer 50 and shifted out serially by a clock 54 which adds clock pulses through inverter 61 to a one-shot multivibrator 59, and an OR gate 58 onto central conductor 24 of cable 22.

If a "one" is shifted out of serializer 50 between two clock pulses, a data pulse is generated by a one-shot multivibrator 60 also connected to input of OR gate 58. If a "zero" is present, no pulse exists between clock pulses. Thus, clock 54 is started and stopped each time the controller wants to address a particular module 14.

Figure 2A:
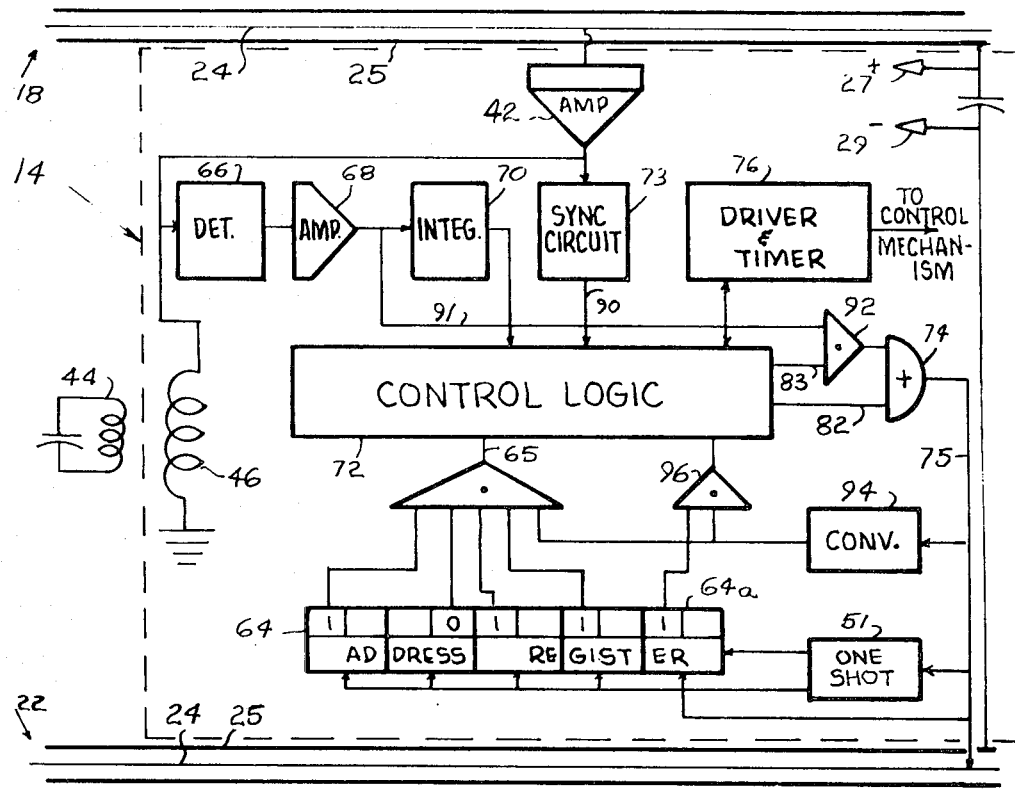
FIG. 2a shows a flux disturbance sensor in a block diagram form.
Figure 2B:
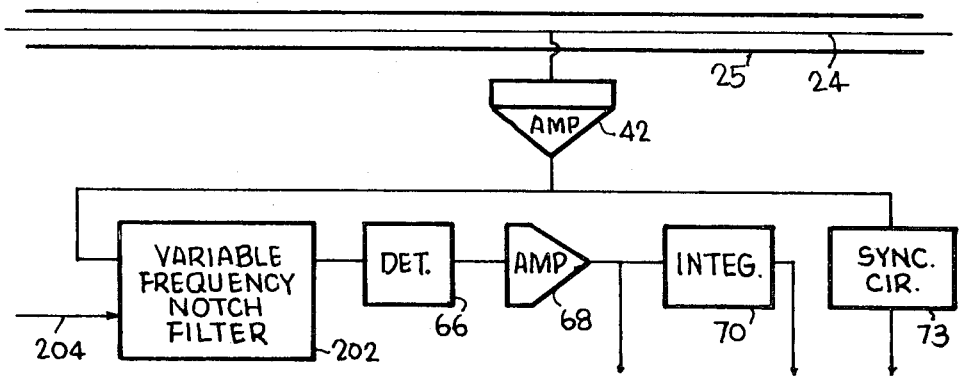
FIG. 2b shows a portion of an alternate form of sensor of the type that encodes analog or digital signals.

Controller 12 can operate to provide a read pulse 56 (FIG. 3) by controlling a separate output line 57 which, through a line driver 62, disconnects OR gate 17 and puts a negative pulse (opposite in polarity to a pulse forming part of an address) onto cable 22, indicating to each module 14 that it has a completed address in its address register 64 (FIG. 2). Alternatively, a read address pulse could be a greater amplitude of the same polarity or of different time duration so as to be easily recognized by modules 14 as the read pulse of the addressing cycle.

Each module 14 (FIG. 2) includes a detector 66 coupled in series with coil 46, an amplifier 68 coupled in series with the output of detector 66, and an integrator 70 coupled in series with the output of amplifier 68. In practice, each coil 46 can be located exteriorly of its module 14 but in relatively close proximity thereto for convenience of installation. The output of integrator 70 is connected to control logic member 72 having hard-wired logic components for handling the signal from integrator 70, member 72 also being coupled by a sync circuit 73 to isolation amplifier 42 for receiving a sync pulse therefrom. An OR gate 74 coupled to the output of control logic member 72 is operable to direct a pulse onto conductor 24 of data cable 22 by lead 75 for return of the pulse to controller 12 through line receiver 41. An output driver and timer 76 controlled by control logic member 72 operates an actuatable mechanism, such as the bolt of a door lock, to cause the door to be opened when driver 76 is actuated.

OPERATION

Apparatus 10 is put into use by actuating sweep generator 16, controller 12, and power supply 20 so that the various signal frequencies are successively applied to cable 18 and the various addresses of modules 14 are successively applied to data cable 22. So long as no key present or data pulses are received from one or more modules 14, controller 12 will continue to address the modules uninterruptedly, generator 16 being continuous in operation at all times.

When an operative condition occurs, e.g., when a resonant circuit 44 is brought into coupled relationship to the inductor 46 of module 14, circuit 44 is caused to resonate when the generator output signal has a particular frequency equal to the resonant frequency of circuit 44. This causes a current to be induced in the inductor of circuit 44, thereby resulting in a dip or change in amplitude of the output or sweep signal as shown by the decrease in amplitude at point 80 (FIG. 3) of curve A. This decrease will be detected by detector 66, amplified by amplifier 68 in the form of a pulse or indication 91, and integrated by integrator 70. This resonance will produce the pulse which is amplified and integrated to eliminate noise or other spurious resonances. Alternatively, the sweep signal with the dip could be sent directly to data cable 22 or gated onto data cable 22 whenever the control module is addressed. In this case, the dip itself is the indication analogous to pulse 91. While a change in amplitude of the sweep signal has been described herein as the aforesaid indication, other characteristics of the sweep signal, such as phase change, could be used for this purpose, if desired.

Integrator 70 provides an output to control logic member 72, indicating that the resonant frequency is to be read by controller 12. During this time, controller 12 is successively addressing the other modules 14 and awaiting a reply from line receiver 41. When the controller addresses a module 14 with resonant circuit 44 present, control logic member 72 changes state so that a "key present" signal is applied by line 82 to the input of an OR gate 74 whose output is coupled by line 75 to conductor 24 of data cable 22. The pulse from gate 74 onto cable 22 is shown in FIG. 3 and denoted by the number 84.

Pulse 84 is received by line receiver 41 and applied to controller 12 which, when it receives the pulse, must stop its polling operation to read a resonant frequency from the corresponding module 14. It must also signify to the module that, in the next R.F. sweep cycle, the module is to place a pulse on data cable 22 at the same time the generator output has the resonant frequency. It can do this with a single read address pulse if the module still has the correct address in it, or it can re-address that particular module, indicating to the module it is ready to receive the pulse corresponding to the resonant frequency. This pulse is denoted by the number 56 in FIG. 3.

Figure 4:
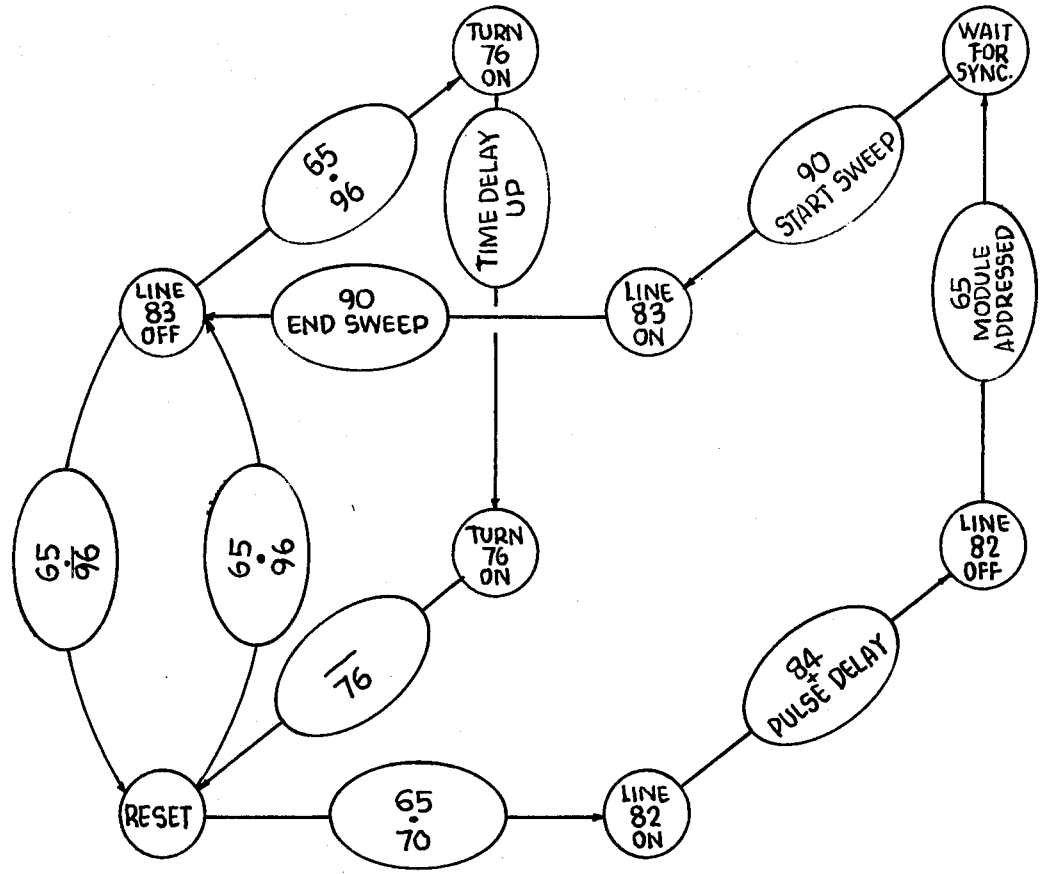
FIG. 4 shows a state diagram illustrating the sequence performed by the control logic each time a flux disturbance is sensed and sent to the central controller thereby.

The module receives a sync pulse 90 through sync circuit 73 (FIG. 2) at the beginning of each R.F. sweep cycle. Sync circuit 73 produces a pulse during the retrace of the sweeping oscillator 16. The sync circuit insures a complete sweep of all frequencies in the case where multiple resonances may be detected at the output of amplifier 68 (FIG. 2) and gated onto data cable 22 through an AND circuit 92 and OR gate 74. During this time, control logic member 72 remains in a particular operating state and awaits instructions from controller 12. The state diagram for control logic 72 normally sets in the reset state as shown in FIG. 4. In this diagram, the circles represent logical states of control logic 72 and the ellipses represent conditions which are necessary to go to the next logical state. FIG. 4 illustrates also that controller 12 can directly control driver and timer 76 of module 14 without going through the flux disturbance sequence.

In the illustrated case of door-actuation, controller 12 would decide whether the frequency of the generator output at the time the corresponding pulse from AND gate 92 was generated is the correct resonant frequency for that module. This is done by comparing the frequency of the generator output determined by frequency counter 47 with the listing of the frequency in the memory of controller 12 for the particular module. If there is a comparison, the controller would re-address the module with the control word denoted in FIG. 3 by 52a which would also include a control word 52b in the control portion of the address. A one-bit control word 52b is illustrated in this particular case. However, the control word could be n bits in length to handle many combinations of control actions.

The controller will send out a negatively going pulse 56 indicating a present address in the particular module. This negative pulse is converted to a positive pulse by level converter 94 (FIG. 2) which signifies through an AND gate 96 to the control logic member 72 to actuate driver 76 and its associated timer so as to open a door. This can be done by control means coupled to the output of driver 76, denoted in FIG. 3, such as a door-opening motor or the like.

If controller 12 decides that the resonant frequency of the pulse from a sensor is not the correct one, i.e., if there is no comparison of frequencies, it addresses module 14 with a "zero" in the control word 52b. This causes control logic member 72 to reset to its initial state. The door would not open and the controller would take appropriate alarm action. In any case, once this action is initiated, the controller is then free and does thereafter continue the polling operation, i.e., successively addressing the modules. While one resonant frequency of the sweep signal has been described above as providing a dip or indication of an operative condition, several such resonant frequencies could be provided to increase the number of combinations of operable conditions, i.e., key codes, at each module.

Apparatus 10 can be constructed so that controller 12 can control a door-operating mechanism of a particular module 14 directly without the need for the presence of a resonant circuit 44. This can be done by addressing the module with a control word present in a control portion 64a of shift register 64 (FIG. 2). Automatically, a signal will be gated into control logic member 72, causing it to change state so that it goes through the normal control sequence wherein driver 76 and its timer are actuated. Thus, in the case of a hotel, a particular door can be unlocked from a central station, such as the cashier's desk.

TIME INTERVAL MEASUREMENT

The resonant frequency received at frequency counter 47 must be determined at the instant the detected resonance pulse 88 is received also by controller 12. A preferred implementation, but not the only method, is to measure the time interval of one cycle of the instantaneous R.F. sweep waveform. When the frequency is measured in one cycle, the value can be stored in the computer quickly and the time interval circuit can be reset so another resonance pulse can be processed almost immediately thereafter in like manner. In this way, a plurality of different resonant circuits can be detected in one R.F. sweep and all of their associated resonant frequencies can be stored directly in controller 12 without the need of external buffers or a memory.

FIG. 5 illustrates a time interval circuit 47 which includes a squaring circuit 102 for receiving the R.F. sweep input, to define the start of each cycle with fast-rise time, positive-going edges. The squared wave drives a gated JK flipflop 104 such that, when a detected resonance pulse 88 (FIG. 3) on cable 22 gates flipflop 104 to an "on" condition, flipflop 104 responds with an output equal to the time for one or, if desired, several cycles of the R.F. signal. When no "data" pulse 88 is on the input line 106 coupled to the central conductor 24 of cable 22, flipflop 104 is off so that its output is low. Even though the clock is active, the flipflop cannot be turned on because the J set line 108 is low. When the "data" pulse 88 arrives at time interval unit 47, line 108 goes high and the next positive going R.F. signal waveform sets flipflop 104 to an "on" condition. Then, line 108 goes low because the Q output of the flipflop is low and line 110 coupled to the J input of a second flipflop 112 is latched to an "on" condition, indicating the time interval as started. Line 110 allows a high-speed switch 114, typically a FET, to start the action of an integrator 116.

Integration circuits having an output proportional to the time intervals integrated thereby are well-known in the art. One integrator particularly suited for this application is a constant current type operable to drive a capacitor 118. The voltage across the capacitor is proportional to the time in which interval switch 114 is active and connects constant current source 120 to capacitor 118 by leads 122 and 124. Once the time interval to be measured is complete, capacitor 118 holds the voltage and the latter is measured by an analog-to-digital converter 126 which sends the data to controller 12. The end of the time interval is determined by a divide-by-N counter 128 and by flip-flop 112.

First, consider the divide-by-one configuration. Once flipflop 104 is turned on, the R.F. frequency clock is allowed to pass through the counter because reset 105 of flipflop 104 is high. Flipflop 112 is also gated "on" by line 110 and the next R.F. positive clock pulse latches flipflop 112 to an "on" condition and drops line 110 signalling the lapse of the time interval from the first positive going R.F. signal waveform to the second R.F. signal wavefrom. It may be desirable to average several R.F. cycles to increase the resolution and to improve accuracy by averaging noise on the waveform over many cycles. The number of cycles measured is determined by N in the divide-by-N counter 128. The key resonance point is now defined by the average of all these cycles but since the R.F. frequency is typically much higher than the sweep, the difference between instantaneous frequency and the average of 16 or 32 of the cycles is practically the same. Once the controller stores this value, it immediately resets capacitor 118 by means of a reset switch 130 and resets flipflops 104 and 112 so that the time interval measuring unit is ready to measure another resonant frequency. The data stored is the reciprocal of frequency and must be divided into unity by the computer if the actual frequency value is necessary.

FREQUENCY DISCRIMINATOR ARRAY

Another preferred means of determining the resonant frequency is a frequency discriminator circuit 140 (FIG. 6). This circuit is particularly applicable when only a single resonant frequency is expected to be determined at any one time or where a small number of different resonances must be detected and when an array of discriminators can be used. The circuit can be located in a module 14 also if only one or two resonant frequencies are desired, since the circuit is simple and quite accurate with respect to frequency drift under varying conditions.

Many different types of FM discriminator circuits have been reported in the literature. A plurality of any such known circuits 142 form parts of circuit 140. Most all have an output waveform with varying frequencies as shown by curve 144 in FIG. 6b where, at the center frequency $f_c$, the voltage crosses from positive to negative and can be detected by a zero crossing detector circuit 146 for each discriminator 142, respectively. Each circuit 146 is constructed to have an output only when the input voltage changes sign. Each discriminator 142 is driven by an isolation amplifier 148 to prevent loading of the R.F. cable and to keep each separately tuned discriminator 142 from affecting an adjacent discriminator. As the R.F. input voltage applied to lead 150 sweeps through each frequency, a particular discriminator 142 in the array is tuned also. A pulse is applied to its respective AND gate 152 if a resonant circuit is present at the corresponding module 14. The corresponding gate 152 will then be enabled when a pulse exists on line 154, the latter being coupled to the output of an AND gate enabled by data pulse 88 from the module and read pulse 158 from the controller. When gate 152 is enabled, a corresponding latch 156 is actuated. At the end of the sweep, the controller turns off the data pulses by dropping line 158 and reading the latches to see which one was actuated. Once the latches are read, the controller resets the latches through line 160 to prepare the discriminator array to read the resonant frequency from another module.

DATA ACQUISITION SYSTEM

Figure 7:
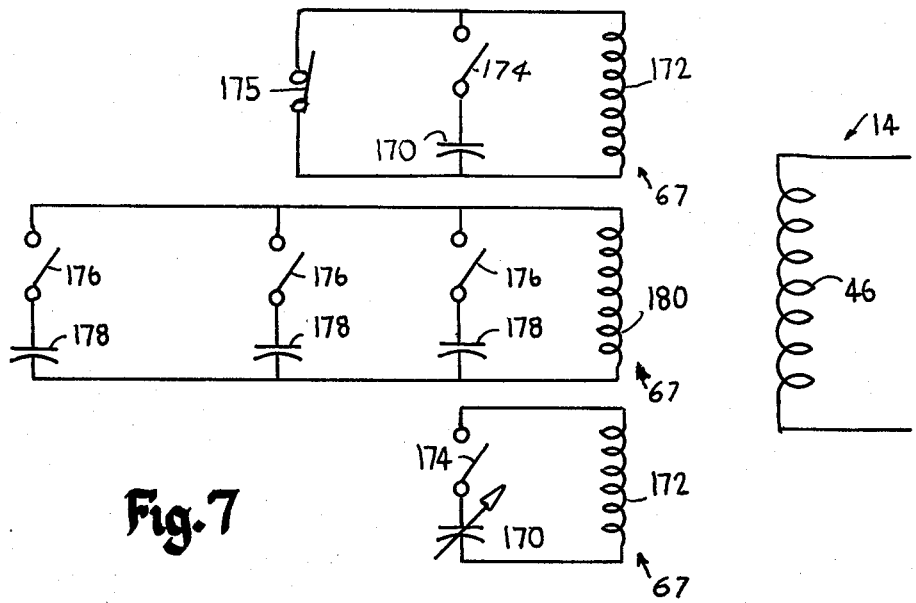
FIG. 7 illustrates several resonant circuits for the input of a flux disturbance sensor with the circuits having respective switches which are closable to indicate specific changes to be sensed.

The present invention is particularly applicable to data acquisition from remote locations from controller 12. Each module 14 can handle any number of digital sense points and at least one analog sense point as shown in FIG. 7. A further distinct advantage is complete electrical and physical isolation between sensed circuits and the corresponding module 14. Separate contact sense points 67 (FIG 7) complete their individual tuned circuits made up of variable capacitor 170 and inductor 172 where each has a different resonance which is sensed by coil 46 whenever a normally open switch 174 is closed. In an alternate version, a normally closed switch 175 in parallel with capacitor 170 is opened to cause a resonance condition upon the occurrence of the desired event. A combination of switches 176 can be used with corresponding capacitors 178 to provide individual sense points in conjunction with coil 180 coupled wit coil 46. The individual sense points have respective resonant frequencies which are in the range of sweep frequencies present at coil 46. The controller must calculate which switches are closed by well-known parallel capacitor formulas. A combination of digital or switching sense and analog or proportional sense is accomplished by capacitor 170, switch 174 and coil 172. The resonant circuit is completed by closing of switch 174 and the frequency at which it is resonant is determined by variable capacitor 170. Of course, any capacitor-type transducer commonly available to sense such things as pressure, displacement, acceleration and the like could be used for capacitor 170.

Inductance of the resonant circuit, i.e., inductance of coil 172 (FIG. 7), can also be varied by moving an iron or ferrite slug in and out of its core or by moving a conductive plate 182 (FIG. 9) close to coil 172, thereby through eddy current loss, changing its effective inductance. Coupled with capacitor 170, this varies the resonant frequency, hence the frequency of the signal received at the controller. If electrical quantities are to be sensed as to their analog value, the quantity can be converted to a voltage to provide a voltage source 184 applied across varactor diode 186 (FIG. 8) through, r.f.c. choke 188 to prevent the resonant circuit frequency oscillations in the varactor diode and inductor coil 190 from being shunted by the circuit of source voltage 184. Bypass capacitor 192 shunts R.F. voltage from the source voltage circuit. Capacitor 194 allows a bias voltage from source 184 to be applied to diode 186. Varactor 186 could be replaced in any solid stage device whose capacitance varies with control voltage.

Figure 8:
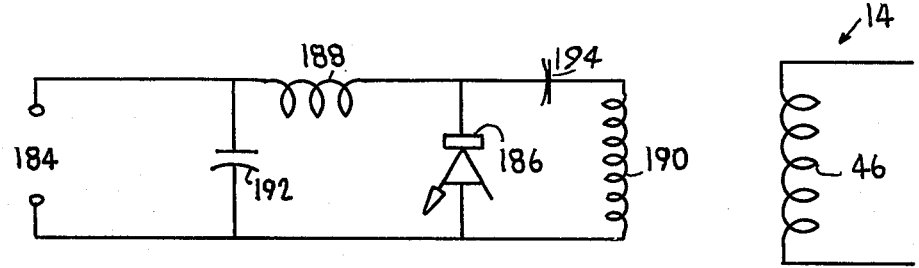
FIG. 8 shows a resonant circuit for the input of a flux disturbance sensor and operated as an analog-to-digital converter.
Figure 9:
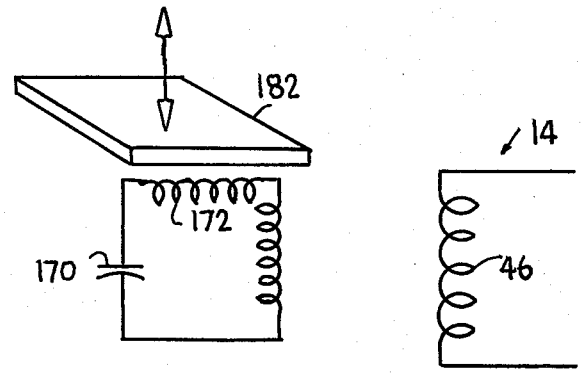
FIG. 9 is a view similar to FIGS. 7 and 8 and shows a moving plate acting as a shorted turn on the resonant circuit for changing the resonant frequency according to the movement of the plate.

It is apparent from the above description that an electrically and physically isolated analog-to-digital converter can be built using the tunable resonant circuits in FIGS. 7, 8 and 9, R.F. sweep generator 16, coil 46, detector 66, amplifier 68 and frequency measuring device 46, such as the time interval measurement unit described above.

DATA ACQUISITION WITHOUT FLUX DISTURBANCE SENSOR COIL

It may be desirable to allow the controller to sense the occurrences of operative conditions by sensing variations in the amplitude of an analog signal from a remotely located flux disturbance sensor module without using resonant circuits of the type shown in FIGS. 7, 8 and 9 and inductive coupling by means of coil 46. In this case, a notch filter 202 (FIG. 2b) is inserted between isolation amplifier 42 and detector 66 to simulate a flux disturbance of the type previously described. The notch filter can be made of passive or active components, designs of which are readily available in the literature. A preferred implementation of filter 202 would be a notch which is electrically tunable over the swept frequency range by variations in the analog voltage applied at input 204. Thus, for the occurrence of each operative condition, there is a particular frequency at which the notch filter is tuned. Very wide tuning range notch filters are available, allowing resolution and wide dynamic range of the analog input to be measured. Detector 66, amplifier 68, integrator 70 and sync circuit 73 operate as described previously as does the rest of the control logic in the sensor module. Other types of tunable circuits, such as series, parallel resonant circuits or frequency discriminators may be used instead of notch filter 202 by modifying detector 66 appropriately.

The circuits of FIGS. 7, 8 and 9 can be adapted to be used instead of notch filter 202 to provide a wide range of transducers which could be connected to a control module 14. Digital transducers usable for this purpose include burglar alarms, door opening and closing switches, thermostatic switches, optical couplers and switches, pressure switches, smoke detectors, motion detectors, high-low limit switches, and any normally open or normally closed data acquisition device. Analog transducers usable for this purpose include current and voltage sensors, rotary and linear motion sensors, analog temperature and pressure and optical sensors, and any data acquisition device that is read as a variable quantity.

In the claims:

1. Apparatus for controlling the operation of a plurality of spaced, independent, actuatable mechanisms comprising: a control module for each mechanism, respectively, each module having first means permitting an enabling device capable of resonanting at a predetermined frequency to be inductively coupled thereto; a sweep generator operable to provide an output signal whose frequency varies successively over a range of frequencies; first conductor means common to the modules for coupling the sweep generator thereto to permit said output signal to be applied simultaneously to the modules, each module having second means thereon responsive to said output signal when the module is inductively coupled to an enabling device and when the output signal has the frequency at which the corresponding enabling device resonates for generating a first signal indicating the inductive coupling between the module and the enabling device and indicating the resonant condition of the last-mentioned enabling device, each module having third means responsive to a second signal for actuating the corresponding mechanism; a central controller; and second conductor means common to said modules for connecting said controller thereto to permit said controller to receive a first signal from a module, said controller being operable to successively address the modules and to generate a second signal after a first signal has issued from a module, said second conductor means being operable to direct the second signal to the third means of a module to actuate the corresponding mechanism.

2. Apparatus as set forth in claim 1, wherein each of said first conductor means and said second conductor means includes a coaxial cable.

3. Apparatus as set forth in claim 2, wherein each module has a number of components responsive to d.c. electrical power, and wherein is included a d.c. power supply having a positive terminal and a negative terminal coupled to the outer conductors of respective cables, and means interconnecting said outer conductors and said components of each module, respectively.

4. Apparatus as set forth in claim 1, wherein said controller has means for generating a control code representing a plurality of addresses for respective modules, and means for directing the code serially onto said second conductor means to successively address said modules as said output signal is applied to said first conductor means.

5. Apparatus as set forth in claim 4, wherein said second signal comprises a portion of the address for a module whose second means has generated a first signal.

6. Apparatus as set forth in claim 1, wherein the lengths of the first conductor means and the second conductor means are substantially the same.

7. Apparatus as set forth in claim 1, wherein is included means coupled with the second conductor means for determining the frequency of each first signal, said controller having a memory adapted to receive and store information corresponding to the resonant frequencies of the enabling devices capable of enabling respective modules, said determining means being coupled to said controller for actuating the latter to cause it to generate said second signal when the frequency of the first signal is compared with and is substantially the same as the corresponding frequency value stored in said memory.

8. A method of controlling a plurality of operable mechanisms at respective first locations spaced from each other comprising: providing a sweep signal source at a second location remote from the first locations with the sweep signals having a frequency which varies successively over a range of frequencies, each first location having a respective frequency of said sweep signal assigned thereto and each mechanism being operable when a control signal is sent from the second location to the corresponding first location; providing first and second signal paths between the second location and the first locations, each path being common to all of the first locations, directing said sweep signal along the first path so that the sweep signal is simultaneously applied to said first locations; successively addressing said first locations by applying respective address signals one after another along said second path to the first locations, changing a characteristic of the sweep signal during a first sweep of the sweep signal if an operative condition exists at a first location; generating a second signal responsive to the change of said characteristic; directing the second signal along the second path to the second location, repeating the addressing of the first locations until the first location at which an operative condition exists is re-addressed; interrupting the address of the first locations when the first location at which the operative condition exists is re-addressed; sending the sweep signal and the second signal simultaneously along the first and second paths, respectively, to the second location when the last-mentioned first location is re-addressed; determining the frequency of the sweep signal corresponding to said change with the frequency determination being made at the second location in response to the reception of the sweep and second signals at said second location; comparing the determined frequency with the frequency assigned to said last-mentioned first location; and directing a control signal from the second location to said last-mentioned first location to cause actuation of the mechanism thereof if the frequency determined at the second location has a value assigned to that of the first location.

9. A method as set forth in claim 8, wherein said determining step includes comparing the frequency of the sweep signal with a predetermined reference at the second location.

10. A method as set forth in claim 8, wherein said determining step includes measuring the time of at least a single cycle of the sweep signal at the second location.

* * * * *